United States Patent
Lange et al.

(10) Patent No.: US 7,098,397 B2
(45) Date of Patent: Aug. 29, 2006

(54) HOUSING ARRANGEMENT WITH AT LEAST ONE JUNCTION BOX

(75) Inventors: Ralf Lange, Horn-Bad Meinberg (DE); Robert Janke, Blomberg (DE); Hubert Loedige, Steinheim (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 11/243,185

(22) Filed: Oct. 5, 2005

(65) Prior Publication Data
US 2006/0081390 A1    Apr. 20, 2006

(30) Foreign Application Priority Data
Oct. 5, 2004    (DE)    ............... 10 2004 049 014

(51) Int. Cl.
*H02G 3/08*    (2006.01)
(52) U.S. Cl. .................. 174/50; 174/520; 174/559; 220/3.2; 220/4.02; 439/535; 439/76.2
(58) Field of Classification Search ............... 174/50, 174/53, 57, 58, 17 R, 52.1; 220/3.2, 3.3, 220/3.4, 3.5, 3.6, 3.7, 3.8, 3.9, 4.02; 435/535, 435/536, 76.1, 76, 76.2; 248/906
See application file for complete search history.

(56) References Cited

U.S. PATENT DOCUMENTS

| 6,100,468 A * | 8/2000 | Niggl et al. ............... 174/52.1 |
| 6,664,472 B1 * | 12/2003 | Saneto et al. ............... 439/139 |
| 6,797,878 B1 * | 9/2004 | Radelet ....................... 174/50 |

FOREIGN PATENT DOCUMENTS

DE    43 20 261 A1    12/1994

* cited by examiner

*Primary Examiner*—Angel R. Estrada
(74) *Attorney, Agent, or Firm*—David S. Safran

(57) ABSTRACT

A junction box with a square housing and with at least opening and terminal strip for electric cables or lines. With the junction box, a housing arrangement can be modularly built from individual junction boxes that can be reliably connected to one another or to a base part. For attaching the junction box to a second junction box or to a base part, there are two pivotable locking elements on the housing which are movable from a first, open position into a second, locking position, and projecting ribs formed in the area of the outside corners on the housing, the locking element having a U-shape of which a U-bridge is used as an actuating clip and two U-legs, with ends which are bent down, and extend around the ribs on the housing of a second junction box or of the base part in the second, locking position.

15 Claims, 5 Drawing Sheets

HOUSING ARRANGEMENT WITH AT LEAST ONE JUNCTION BOX

BACKGROUND OF THE INVENTION

1. Field of the Invention

The invention relates to a housing arrangement with at least one junction box, a base part and a cover, the junction box having a square housing, in the housing there being a terminal strip which has at least one terminal for electrical connection of an electric cable or a line, and the housing having at least one opening for an electric cable or line. In addition, the invention relates to a junction box with a square housing and with at least one terminal strip which has at least one terminal for electrical connection of an electric cable or a line, the housing having at least one opening for the electric cable or the line.

2. Description of Related Art

Junction boxes, which are often also called wiring boxes, outlet boxes, or cable boxes, are known in manifold versions. If it is a matter of connecting a cable to an electrical device or a machine, the box is called an outlet box. If two cables or lines are to be connected to one another, the box is called a junction box. Generally, the outlet box and the junction box are made essentially identically so that any below reference to a junction box is always intended to encompass an outlet box as well.

These boxes generally have a bottom part and a cover which can be attached by screws onto the bottom part. The known boxes have different cross-sectional configurations, and in their interior, the terminals for electrical connection of an electric cable or a line are arranged differently. Generally, instead of individual terminals, continuous terminal strips are used which have several terminals. German Patent Application No. DE 43 20 261 A1 discloses attaching the terminals to the floor of the bottom part of the housing. The terminals can be fixed on the floor of the box by additional fasteners, for example, by screws. In addition, the molding of projections on the floor onto which the terminals can be slipped is also known.

The core of an electric cable can be connected to each terminal. Instead of electric cables which are used for transmission of current, therefore, which supply a system or machine with the necessary operating current or the necessary operating voltage, electric lines which are used primarily, or in addition, to transmit electrical signals, i.e., for data transmission, can also be connected to the junction boxes. This is the case, for example, in so-called sensor-actuator systems. The junction boxes are thus used as mechanical protection for the terminals which are located in the interior and as electrical protection for the electrical connection which is established on the terminals between the different cables or lines. The housing of the junction boxes therefore generally are made of a plastic which satisfies the respective requirements, with a corresponding safety class, for example, IP 66 or higher.

These junction boxes are often located together in a plurality in control cabinets, the bottom parts often having attachment possibilities, for example, hooks or holes, for mounting of the junction boxes on a mounting rail or to a mounting wall. To connect the individual junction boxes to one another, bottom parts are known which have hooks on their side walls so that several junction boxes can be connected to one another to form a housing arrangement, the individual junction boxes being located in one plane next to one another and on top of one another. However, the disadvantage here is that, for the molded-on hooks, there is the danger that they will break off, at least when the junction boxes are repeatedly connected to one another and disconnected again. Moreover, the locking of the individual junction boxes which can be achieved by the hooks is not especially reliable when the housing arrangement is exposed to mechanical stress, for example, during vibrations.

SUMMARY OF THE INVENTION

Therefore, a primary object of the present invention is to provide a housing arrangement and a junction box of the initially described type which enables the user to build the housing arrangement modularly, and in doing so, to connect the individual junction boxes reliably to one another or to a base part. In this case, it will be possible to economically produce the junction boxes.

This object is achieved in the initially described housing arrangement in that, on the housing of the junction box, at least one locking element is pivotally arranged such that it can be moved out of a first, i.e., an open position, into a second, i.e., a locking position, that projecting ribs are formed in the area of the outside corners on the housing of the junction box or on the base part, the locking element having an essentially U-shape and having a U-bridge which is used as an actuating clip and two U-legs, with ends which are bent down such that, in the second, i.e., locking position, they extend around the ribs on the housing of a second junction box or of the base part.

The arrangement of the locking element on the housing of the junction box makes it possible to connect the junction box easily, but reliably, to a second junction box or to the base part, as a result of the pivotability of the locking element, the locking also being easily cancelled again so that there is great flexibility in the arrangement of the housing arrangement. Because the locking element is essentially U-shaped, it can extend around one side of the housing so that the outside dimensions of the junction box are only slightly increased by the locking element. In addition to the U-bridge which is used as the actuating clip, the locking element has two U-legs with ends bent down such that, in the second position, i.e., the locking position, they extend around the corresponding ribs on the housing of a second junction box or on the base part.

To mount two junction boxes on top of one another, thus the locking element of one junction box interacts with the ribs which have been formed on the housing of the other junction box, and by the pivoting arrangement of the locking element, the bent-down ends of the U-legs can be easily caused to engage the ribs.

According to one preferred configuration of the housing arrangement in accordance with the invention with at least two junction boxes, the individual junction boxes can be mounted on top of one another turned by 0°, 90°, 180° or 270° relative to one another. This makes it possible to optimally align the individual junction boxes with the openings located in the housings, each to the respective direction of the incoming or outgoing cables or lines. The housing arrangement as according to the invention thus represents a modularly buildable power distribution board in which the required number of junction boxes can be mounted on top of one another as a tower. The attachment of the individual junction boxes which are mounted on top of one another thus takes place easily by means of locking elements which are located on the housing of the individual junction boxes.

In addition to the above described housing arrangement, this invention also relates especially to an individual junction box with a square housing and with at least one terminal strip for electrical connection of an electric cable or a line, the housing having at least one opening for the electrical cable or the line. The junction box in accordance with the invention, which is especially suitable for use in the above described housing arrangement, is first of all, essentially characterized in that, on the housing, at least one locking element for attachment of the junction box to a second junction box or to the base part is arranged with a pivoting capacity such that the locking element can be moved out of a first, i.e., open position into a second, i.e., locking position, that projecting ribs are formed in the area of the outside corners of the housing, and that the locking element is bent essentially in a U-shape and has a U-bridge which is used as an actuating clip and two U-legs, with ends which are bent down such that in the second position, i.e., the locking position, they extend around the ribs on the housing of a second junction box or of the base part.

As has already been stated in conjunction with the housing arrangement of the invention, the arrangement of the locking element on the housing of the junction box enables simple but still reliable attachment of the junction box to a second junction box or to the base part. The ribs formed on the corners of the housing, at the same time, make it possible for a second, correspondingly formed junction box to be attached with its fastener to the first junction box.

According to one preferred configuration, on the junction box, there are two locking elements pivotably mounted on two opposing sides of the housing. This further increases the reliability of attachment, especially tilting to one side being prevented.

According to another, especially advantageous configuration of the invention, the locking element has a spring-loaded anti-release element, the locking element being kept by the anti-release element in the second position, i.e., the locking position, and only by applying a force which counteracts the spring force of the anti-release element can the locking element be swung into the first position, i.e., the open position. The anti-release element thus reliably prevents the locking element from unintentionally "swinging back" out of the locking position. This ensures that the attachment between two junction boxes or between one junction box and the base part is not unintentionally cancelled even during strong vibrations which can occur especially when the junction box or the housing arrangement is located on a machine part. Because the anti-release element is spring-loaded, the locking element, on the one hand, is automatically kept in the second position but, on the other hand, intentional unlocking of the locking element is easily possible.

Advantageously, the two U-legs of the locking element are made as an anti-release element. The two U-legs then have a fastening area, a spring area and a connecting area, the locking element in the fastening area being arranged to pivot on the housing, the connecting area, on the one hand, being connected to the U-bridge, and on the other hand, by way of the spring area to the fastening area, and the fastening area having the bent-down ends of the U-legs. Because the two U-legs are made as an anti-release element, the number of required components is reduced.

In particular, the locking element with the U-bridge, which is used as an actuating clip, and the U-legs, which are used as an anti-release element, can be punched out of a metal part in one piece and bent down.

Pivoting support of the locking element which is preferably made of metal on the housing according to one preferred configuration takes place by one hole being formed in the fastening area of each of the U-legs, and by two pins corresponding thereto being formed on the two opposing sides of the housing, the fastening areas with the holes being capable of being locked onto the pins so that the pins form the axis of rotation for the locking element. The pins are advantageously integrally connected to the housing. In addition, it is also fundamentally possible to make corresponding holes on two opposing sides of the housing which can then be engaged by the pins which are located on the fastening area of the U-legs.

To lock the locking element in the second position, i.e., locking position, the anti-release element can preferably be fixed for its part. According to one preferred configuration, for this purpose, in the connecting area of the U-legs, a release recess is formed, and on the housing, a corresponding release hook is formed, the release hook in the second position, i.e., locking position, engaging the release recess, and in this way, preventing the locking element from pivoting into the first position. If the release hook extends into the release recess in the connecting area, first of all, the anti-release element is fixed in this way. Because the connecting area is connected by way of the spring area to the fastening area of the anti-release element, the fastening area is then also fixed so that the locking element cannot be pivoted. This locking can by cancelled, at this point, by the connecting area being pressed down against the direction of the spring force of the spring area, by which the release hook no longer engages the release recess. In this way, the U-legs which are used as an anti-release element are no longer fixed in their position so that the locking element can be pivoted out of the second position into the first position.

According to one preferred configuration of the junction box of the invention, the spring area is made meander-shaped. In this way, the spring area of the U-legs, and thus, the locking element, can be altogether produced very easily by punching and bending. Since the spring area represents the most delicate point on the locking element, according to one preferred configuration, it is provided that the U-legs of the locking element are each covered by a protective element, the protective elements being integrally connected to the U-bridge and being bent essentially parallel to the U-legs. By covering the U-legs, especially also the mechanically sensitive spring area, the spring area is protected against damage from the outside. Since the protective elements are integrally connected to the U-bridge, the labor input in the production of the locking element is not significantly increased by their shaping. In particular, separate components are not necessary so that separate attachment of the protective elements to the locking element is not necessary either.

In particular, at this point, there is a host of possibilities for embodying and developing the housing arrangement and the junction box in accordance with the invention. In this regard, reference is made to the following detailed description of a preferred embodiment in conjunction with the accompanying drawings.

DETAILED DESCRIPTION OF THE INVENTION

Figure 1:
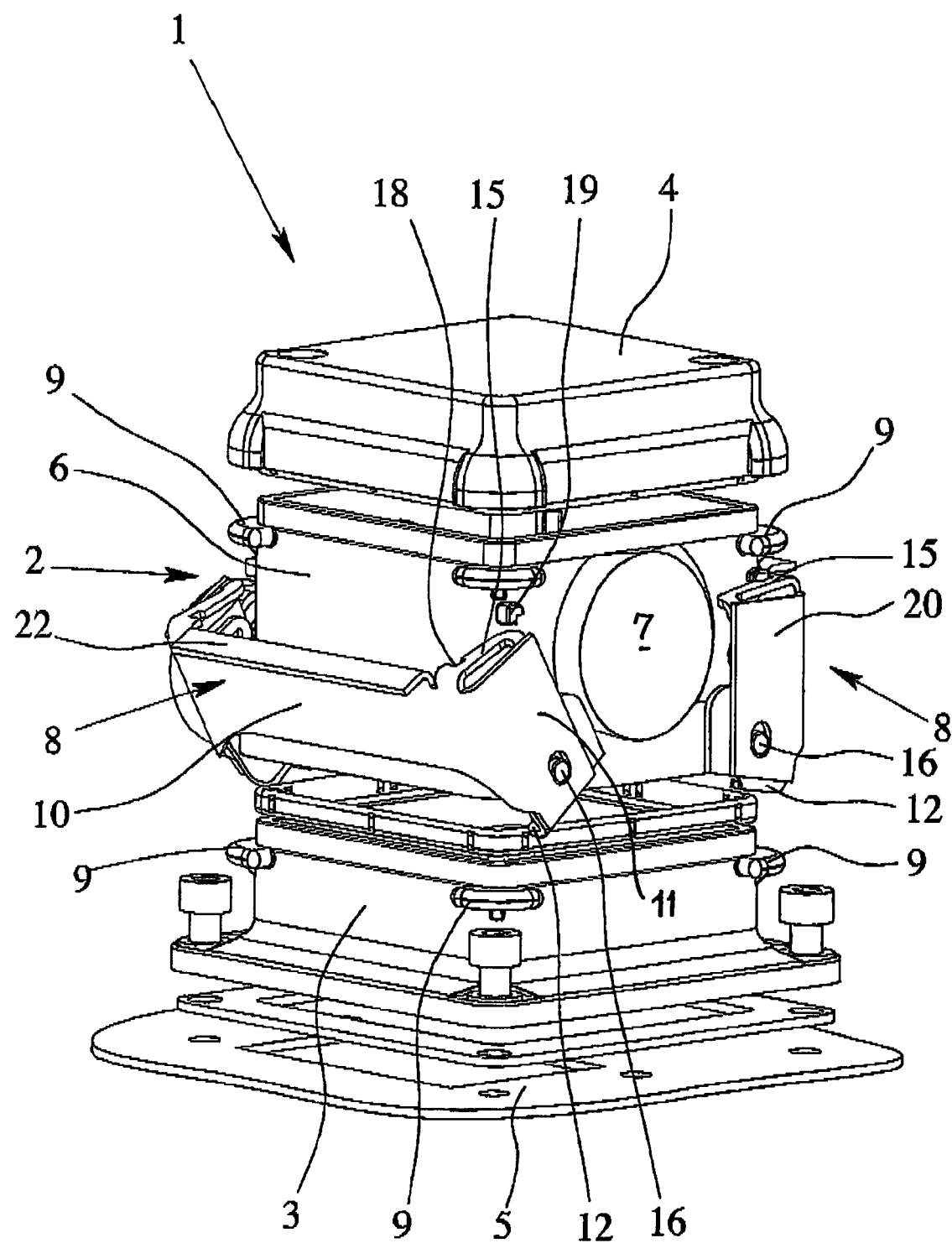
FIG. 1 is a perspective view of a housing arrangement in accordance with the invention with a junction box, a base part and a cover, in the not yet installed state.
Figure 2:
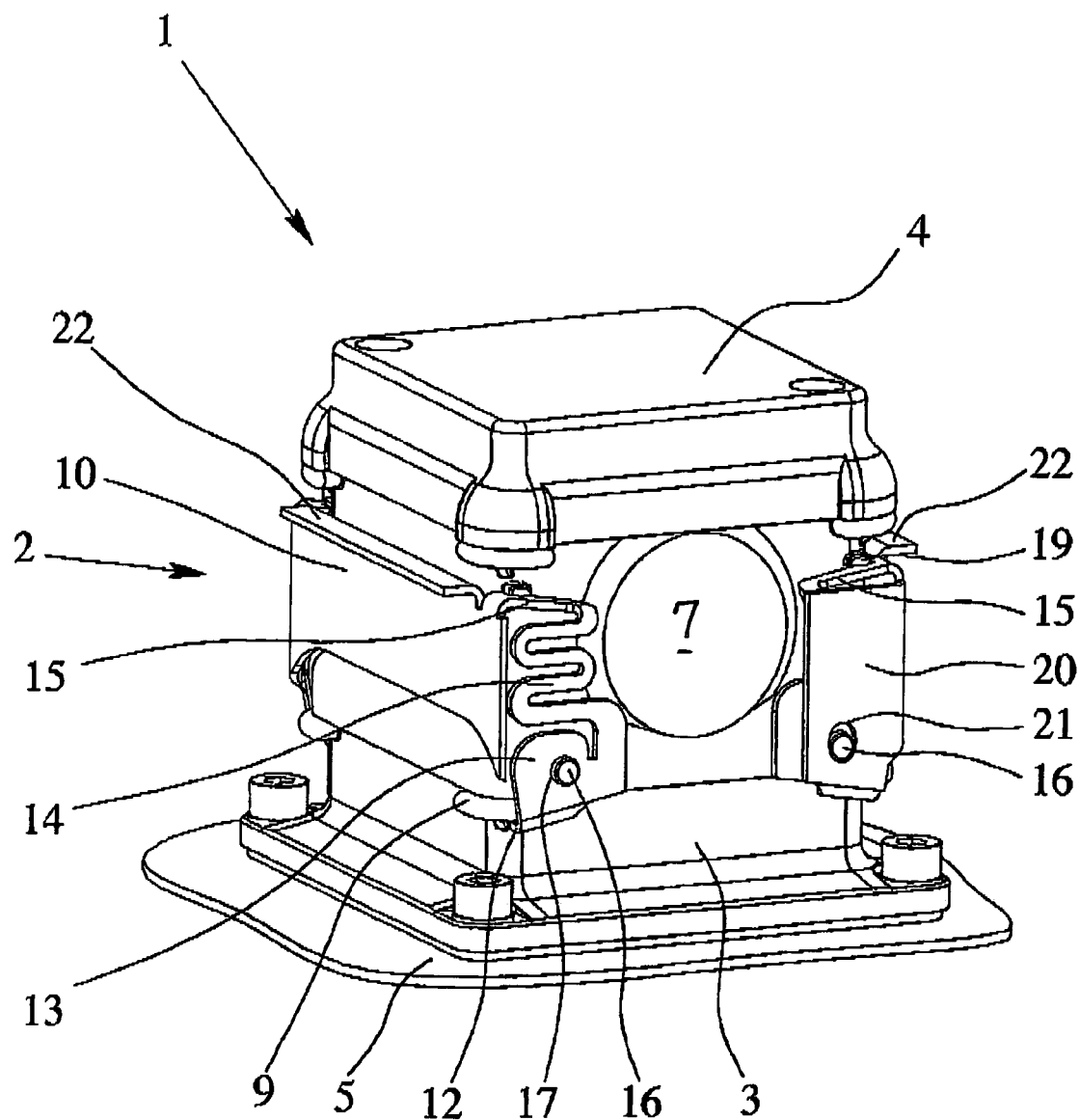
FIG. 2 is a perspective view of the housing arrangement of FIG. 1 in the mounted state.
Figure 5:
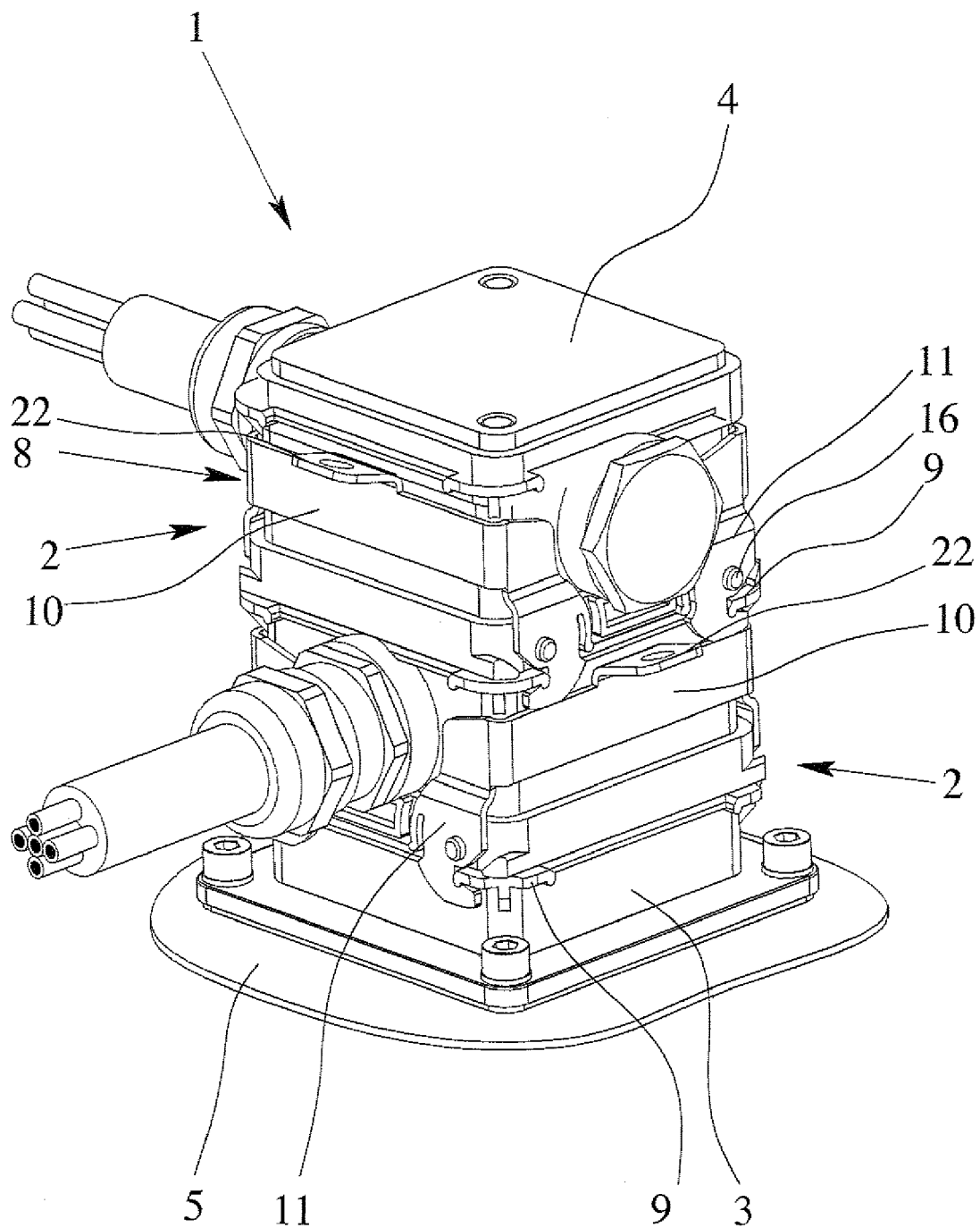
FIG. 5 is a perspective view showing two individual junction boxes mounted one on top of the other.

FIGS. 1 and 2 show a housing arrangement 1 with a junction box 2, a base part 3 and a cover 4. In addition to the embodiment of a housing arrangement 1 with a junction box 2 which is shown here, it is also possible to arrange several junction boxes 2 on top of one another so that a tower formed of several stacked junction boxes 2 is formed (see. FIG. 5). The cover 4 is then screwed onto only the uppermost junction box 2, while the base part 3 is connected to only the lowermost junction box 2. The housing arrangement 1 can be attached by way of the base part 3, for example, to a machine housing 5, which is shown only by way of extract here, or mounted in a control cabinet, The junction box 2 has a square housing 6 in which, for connection of an electric cable or line, there is a terminal strip (not shown here) and which has several terminals. The terminal strip can be especially a connector in which the individual terminals are made as screw force terminals or spring force terminals. When several junction boxes 2 are located on top of one another, a simple cascadable connection can be built using the individual connectors. In order to be able to connect an electric cable or a line to the terminal strip which is located within the housing 6, the housing 6 has at least one opening 7. The cable can then be fastened in the opening 7 by means of a cable union.

To attach the junction box 2 to a second junction box, or as shown here, to the base part 3, there are two pivotable locking elements 8 on the housing 6, and in the area of the outside corners, projecting ribs 9 are formed on the housing 6 of the junction box 2 and on the base part 3. The locking element 8 which can be pivoted out of a first position, i.e., the open position into the second position, i.e., the locking position, is made essentially U-shaped, the locking element 8 having a U-bridge 10 which is used as an actuating clip and two U-legs 11, with ends 12 bent down such that, in the second position, they extend around the ribs 9 on the base part 3. For the junction box 2 shown in FIG. 1, the locking element which is located on the left side of the housing 6 is in the first position, i.e., the open position, and the locking element 8 which is located on the right side of the housing 6 is shown in the second position, i.e., the locking position. Moreover, FIG. 1 shows that on all four corners of the housing 6 of the junction box 2 or of the base part 3, there are the corresponding ribs 9 which each extend by roughly 270° around the corners so that the junction box 2 can be fixed selectively in four positions turned 90° at a time relative to one another on the base part 3.

In order to fix the locking element 8 in the second position, i.e., the closed position, the two U-legs 11 are made as spring-loaded anti-release elements. The two U-legs 11 for this reason have a fastening area 13, a spring area 14 and a connecting area 15 (FIG. 2). As is especially apparent from FIGS. 2 & 4, the locking element 8 is pivtotally mounted on the housing 6 in the region of the fastening areas 13. For this reason, on each of the two opposing sides of the housing 6, a respective pin 16 is formed, and in the fastening area 13 of the U-legs 11, a respective hole 17 is formed for accommodating the pins 16. The pins 16 thus form the axis of rotation for the locking element 8. In addition to the hole 17, the fastening area 13 also has the bent end 12 of the U-leg 11 so that the fastening area 13, on the one hand, is used to support the locking element 8 on the housing 6, and on the other hand, to fix the junction box 2 on the base part 3 or on another junction box 2.

Figure 3A:
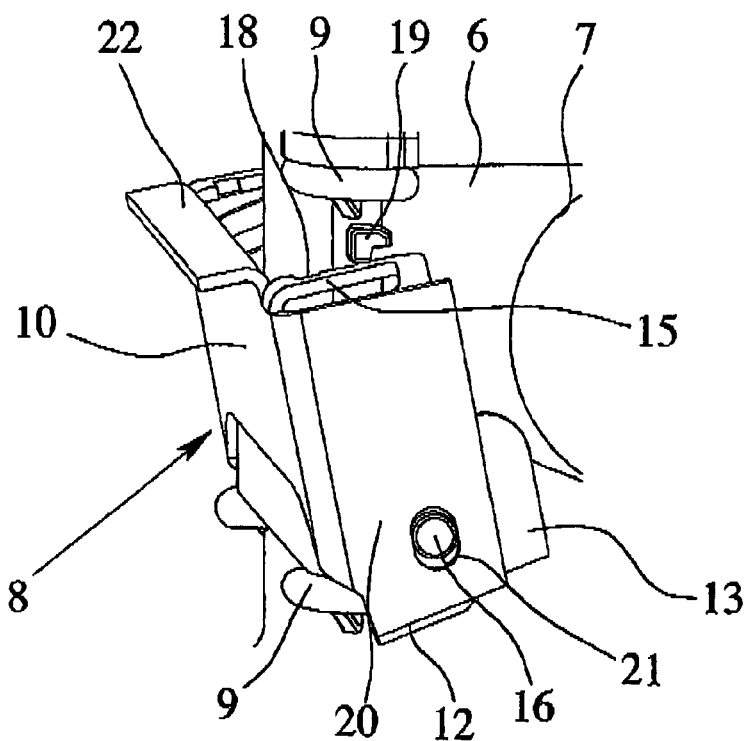
FIGS. 3a & 3b are enlarged views of a portion of a junction box of the invention with a locking element in the first position, i.e., open position and the second position, i.e., locking position, respectively.
Figure 3B:
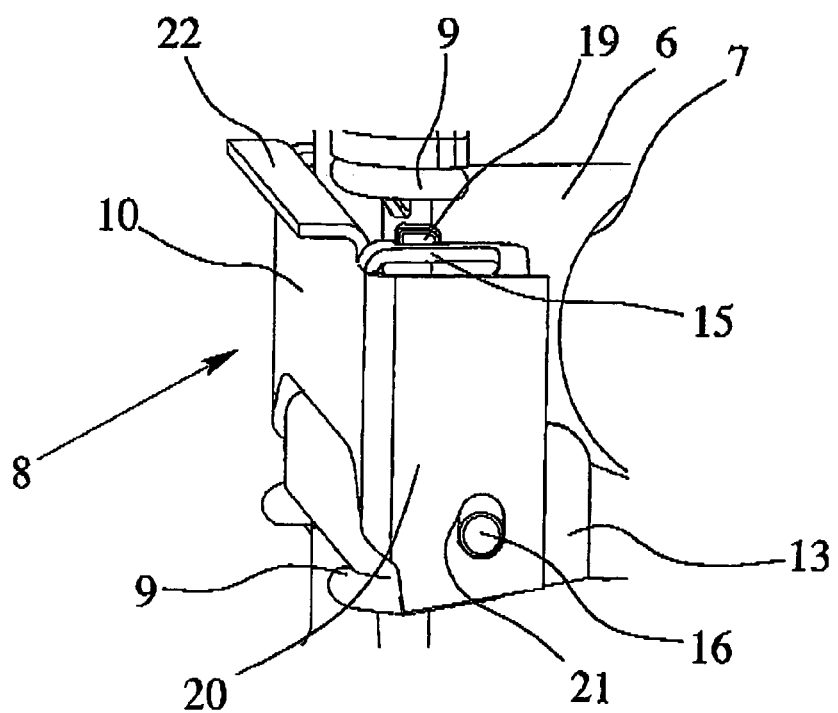
Figure 4:
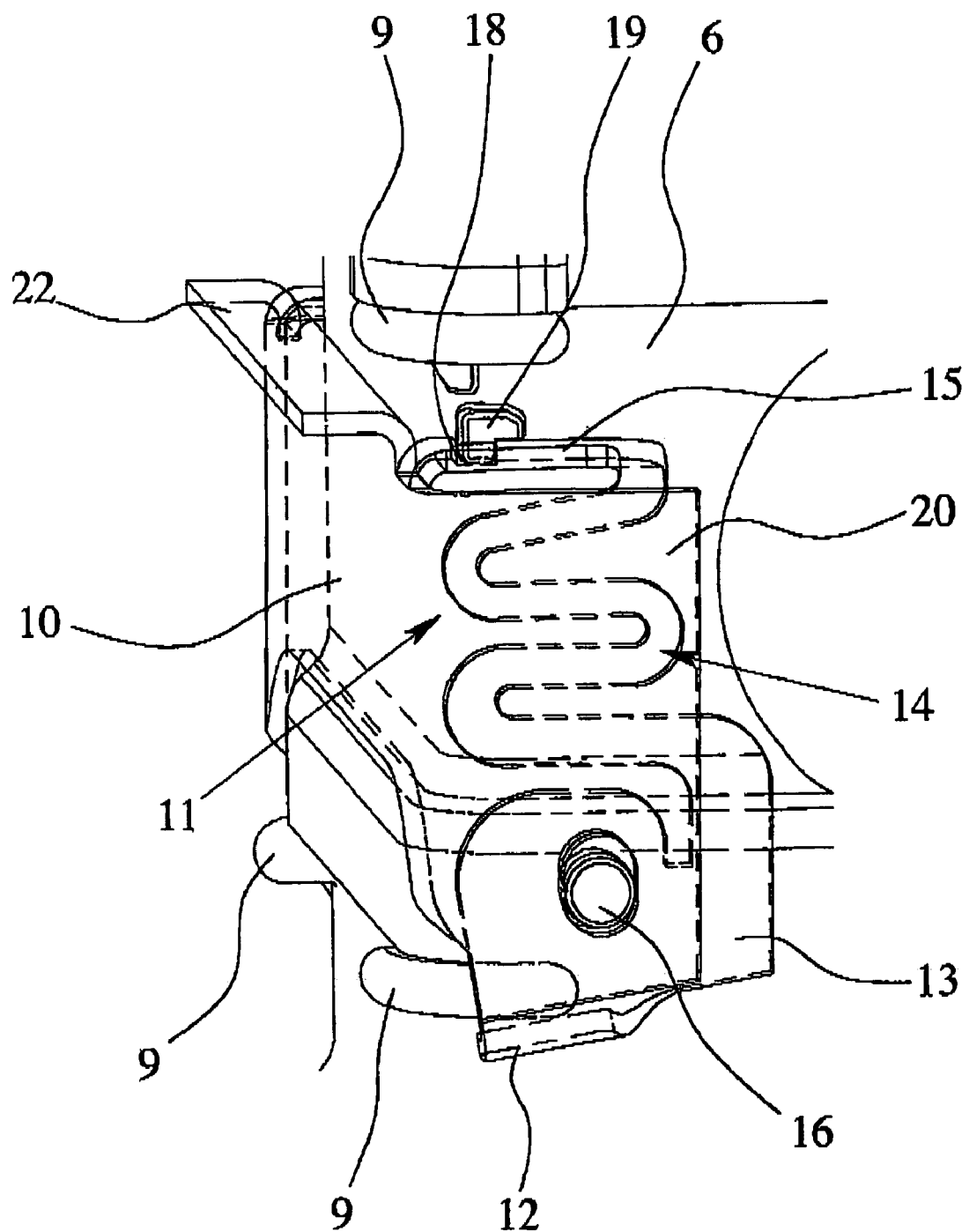
FIG. 4 is an enlarged view of a portion of a junction box in accordance with the invention with a locking element.

To lock the U-legs 11 which are used as anti-release elements, in each of the connecting areas 15 there is a respective release recess 18, and corresponding thereto, a respective release hook 19 is formed on the housing 6. In the second position of the locking element 8 which is shown in FIGS. 2, 3b & 4, the release hook 19 engages the release recess 18 in the connecting area 15, by which the U-legs 11, and with them, the locking element 8 altogether are fixed in their position. Thus, the locking element 8 cannot unintentionally pivot back out of the second position, i.e., the locking position into the first position, i.e. the open position.

If the locking element 8 is to be intentionally pivoted out of the locking position into the open position, provisions must be made for the release hooks 19 to no longer engage the release recess 18 in the connecting area 15. To do this, the connecting area 15 must be pressed down against the spring force of the spring area 14 which is made meandershaped, and at the same time, the locking element 8 must be swung down. Accordingly, when the junction box 2 is locked on the base part 3, the locking element 8 must be pressed down simultaneously with the pivoting motion out of the first position into the second position against the spring force of the spring area 14, so that the connecting area 15 can be swung past the release hook 19 until the release hook 19 locks in the release recess 18.

To protect the mechanically somewhat more sensitive spring area 14, the U-legs 11 of the locking element 8 are each covered by a protective element 20. The protective elements 20 are formed by two metal tabs which are connected integrally to the U-bridge 10 and are bent essentially parallel to the U-legs 11. The locking element 8 is thus altogether made integrally, i.e., with the U-bridge 10 which is used as an actuating clip, the U-legs 11 which act as anti-release elements, and the protective elements 20, and is essentially U-shaped. In order to prevent damage to the spring area 14 by pressing down too vigorously on the connecting area 15 or the U-bridge 10, in each of the protective elements 20, a respective lengthwise hole 21 is formed into which the pins 16 project through the holes 17 in the U-legs 11. By the corresponding dimensioning of the lengthwise hole 21, thus the maximum spring path can be fixed when the connecting area 15 is pressed down. Further deflection of the U-leg 11, i.e., further compression of the spring area 14 which could possibly lead to destruction of the spring area 14, is then prevented by the upper edge of the lengthwise hole 21 striking the pin 16.

To better illustrate how the U-legs 11 which are used as anti-release elements work, in FIG. 2, the protective element 20 on one U-leg 11 of the left locking element 8 is cut away. In FIG. 4, for the same reason, the areas of the U-leg 11 which are covered by the protective element 20, i.e., the spring area 14 and the connecting area 15, are shown in broken lines. For easier actuation of the locking element 8 which closely adjoins the housing 6 in the second position, on its U-bridge 10, a grip section 22 is bent down. To release the locking, the grip section 22 can be pressed down, and then, the locking element 8 can be swung down. After which the ends 12 of the U-legs 11 release the ribs 9 by the associated pivoting motion so that the junction box 2 can be lifted off the base part 3.

What is claimed is:

1. Housing arrangement, comprising:
   at least one junction box having a square housing containing a terminal strip with at least one terminal for electrical connection of an electric cable or a line and having at least one opening for the electric cable or line
   a base part and
   a cover,
   wherein projecting ribs are formed in the area of at least one of outside corners of the housing of the junction box and the base part, wherein at least one locking element is pivotably arranged on the housing of the junction box such that it can be moved out of a first, open position into a second, locking position, the locking element being essentially U-shaped having a U-bridge which forms an actuating clip and two U-legs, ends of the U-legs have a bent down portion which, in the second, locking position extend around the ribs of the housing of a second, like junction box or of the base part.

2. Housing arrangement as claimed in claim 1, wherein said at least one junction box comprises at least two junction boxes, and wherein the individual junction boxes are mountable one on top of the other in positions in which one of the junction boxes is turned relative to the other by any of 0°, 90°, 180° or 270°.

3. Junction box having a square housing containing a terminal strip with at least one terminal for electrical connection of an electric cable or a line and having at least one opening for the electric cable or line,
   wherein projecting ribs are formed in the area of outside corners of at least one of the housing of the junction box and a base part,
   wherein at least one locking element is pivotably arranged on the housing of the junction box for movement out of a first, open position into a second, locking position, the locking element being essentially U-shaped, having a U-bridge which forms an actuating clip and two U-legs, ends of the U-legs having a bent-down portion which, in the second, locking position, are able to extend around the ribs of the housing of a second, like junction box or of the base.

4. Junction box as claimed in claim 3, wherein said at least one locking element comprises two locking elements, each said locking element being pivotably arranged on a respective one of two opposing sides of the housing.

5. Junction box as claimed in claim 3, wherein the locking element has a spring-loaded anti-release element, the locking element being kept by spring force of the anti-release element in the second, locking position and is pivotable into the first, open position only by applying of a force which counteracts the spring force of the anti-release element.

6. Junction box as claimed in claim 5, wherein the U-legs of the locking element form an anti-release element and each has a fastening area, a spring area and a connecting area, wherein the locking element is pivotally mounted on the housing in the fastening area, wherein the connecting area is connected to the U-bridge and by way of the spring area to the fastening area, and wherein the fastening area has the bent-down portion of the U-legs.

7. Junction box as claimed in claim 6, wherein, on each of two opposing sides of the housing, there is a respective pin which forms an axis of rotation for the locking element, and wherein a hole is provided in the fastening area of the U-legs of the locking element for accommodating a respective one the pins.

8. Junction box as claimed in claim 6, wherein a release recess is formed in the connecting area and a corresponding release hook is formed on the housing, the release hook in the second, locking position engaging the release recess for preventing the locking element from pivoting into the first position.

9. Junction box as claimed in claim 6, wherein the spring area is made meander-shaped.

10. Junction box as claimed in claim 6, wherein each of the U-legs of the locking element is covered by a respective protective element which is integrally connected to the U-bridge and extends essentially parallel to the U-legs.

11. Junction box as claimed in claim 7, wherein each of the U-legs of the locking element is covered by a respective protective element which is integrally connected to the U-bridge and extends essentially parallel to the U-legs.

12. Junction box as claimed in claim 11, wherein a lengthwise hole is formed in each of the protective elements for accommodating the pins.

13. Junction box as claimed in claims 3, wherein a grip section is formed by a bent portion of the U-bridge of the locking element.

14. Junction box as claimed in claim 3, wherein the locking element is a one-piece bent metal part.

15. Junction box as claimed in claim 3, wherein the housing has two openings for electric cables or lines, one in each of two opposite side walls.

* * * * *